United States Patent
Rowley

(10) Patent No.: US 7,945,946 B2
(45) Date of Patent: May 17, 2011

(54) ATTRIBUTE LEVEL ACCESS CONTROL

(75) Inventor: Peter A. Rowley, Ben Lomond, CA (US)

(73) Assignee: Red Hat, Inc., Raleigh, NC (US)

( * ) Notice: Subject to any disclaimer, the term of this patent is extended or adjusted under 35 U.S.C. 154(b) by 1117 days.

(21) Appl. No.: 11/703,291

(22) Filed: Feb. 6, 2007

(65) Prior Publication Data

US 2008/0189285 A1 Aug. 7, 2008

(51) Int. Cl.
*H04L 29/06* (2006.01)
*G06F 21/22* (2006.01)

(52) U.S. Cl. .......................... 726/4; 713/166
(58) Field of Classification Search .................. None
See application file for complete search history.

(56) References Cited

U.S. PATENT DOCUMENTS

| | | | |
|---|---|---|---|
| 6,785,686 B2 * | 8/2004 | Boreham et al. ................ | 1/1 |
| 7,194,764 B2 * | 3/2007 | Martherus et al. .............. | 726/8 |
| 7,320,074 B2 * | 1/2008 | Eggebraaten et al. .......... | 713/182 |
| 7,457,832 B2 * | 11/2008 | Baird et al. ..................... | 1/1 |
| 7,711,750 B1 * | 5/2010 | Dutta et al. ..................... | 707/784 |
| 2005/0216485 A1 * | 9/2005 | Bell et al. ........................ | 707/100 |
| 2005/0228886 A1 * | 10/2005 | Cain et al. ....................... | 709/226 |
| 2005/0257245 A1 * | 11/2005 | Patrick et al. ................... | 726/1 |
| 2007/0089167 A1 * | 4/2007 | Villavicencio .................. | 726/5 |

OTHER PUBLICATIONS

"Managing Access Control", iPlanet Directory Server: Administrator's Guide, Version 5.1, Dec. 2001, Chapter 6, 68 pages, Sun MicroSystems, Inc.
"Designing a Secure Directory", iPlanet Directory Server: Deployment Guide, Version 5.1, Dec. 2001, Chapter 7, 26 pages, Sun MicroSystems, Inc.
"Designing a Secure Directory", Netscape Directory Server: Deployment Guide, Version 7.0, Oct. 2004, Chapter 7, 32 pages, Netscape Communications Corporation.
"Managing Access Control", Red Hat Directory Server: Adminstrator's Guide, Version 7.1, May 2005, Updated Feb. 2009, Chapter 6, 78 pages, Red Hat, Inc., Raleigh, North Carolina, U.S.A.
"Designing a Secure Directory", Red Hat Directory Server: Deployment Guide, Version 7.1, May 2005, 34 pages, Red Hat, Inc., Raleigh, North Carolina, U.S.A.
Stokes, et al., "Access Control Model for LDAPv3" The Internet Society, Jun. 29, 2001, 93 pages, accessed at http://www3.ietf.org/proceedings/01aug/I-D/draft/ietf-ldapext-acl-model-08.txt.

* cited by examiner

*Primary Examiner* — Minh Dinh
*Assistant Examiner* — Venkat Perungavoor
(74) *Attorney, Agent, or Firm* — Blakely, Sokoloff, Taylor & Zafman LLP

(57) ABSTRACT

A method and apparatus for applying access control instructions to attributes. A request is received for permission to perform an operation on an attribute associated with an access control instruction. The access control instruction specifies an allowed type of channel for the operation. If a secure channel has been established with the requester, the permission to perform the action is granted.

16 Claims, 4 Drawing Sheets

ATTRIBUTE LEVEL ACCESS CONTROL

TECHNICAL FIELD

Embodiments of the present invention relate to a Lightweight Directory Access Protocol (LDAP), and more specifically to access control on attributes within LDAP entries.

BACKGROUND

Light Weight Directory Access Protocol (LDAP) has become very popular due to its efficient and fast data access. A large number of applications/services are currently being developed which use an LDAP directory as their centralized data repository.

The LDAP directory stores entries as a tree. Each entry may consist of one or more attribute names and attribute values. An entry may be uniquely identified by its distinguished name (DN) that may include a common name (cn) attribute of the entry and DN of a parent entry.

The contents of the entries are governed by an LDAP directory schema. The schema defines object classes, and each entry has an objectClass attribute containing named classes defined in the schema. The objectClass attribute may be multivalued, and contain the class "top" as well as some number of other classes. The schema definition for each class that an entry belongs to defines what kind of object the entry may represent (e.g., a person, organization or domain). Membership in a particular class gives the entry the option of containing one set of attributes (optional attributes), and the obligation of containing another set of attributes (mandatory or required attributes). For example, an entry representing a person might belong to the class "person". Membership in the "person" class would require the entry to contain the "sn" and "cn" attributes, and allow the entry also to contain "userPassword", "telephoneNumber", and other attributes.

An LDAP directory server includes one or more access control mechanisms. Access control mechanisms evaluate requests for access to protected resources and make decisions about whether those requests should be granted or denied. In order to make a decision on whether to grant or to deny a request for access to a protected resource, an access control mechanism examines policy data that is stored in the form of access control information (ACI). The access control information describes security-relevant characteristics of the requesting subject and the rules which govern the use of the target object.

BRIEF DESCRIPTION OF THE DRAWINGS

The present invention is illustrated by way of example, and not by way of limitation, in the figures of the accompanying drawings and in which.

DETAILED DESCRIPTION

Figure 1:
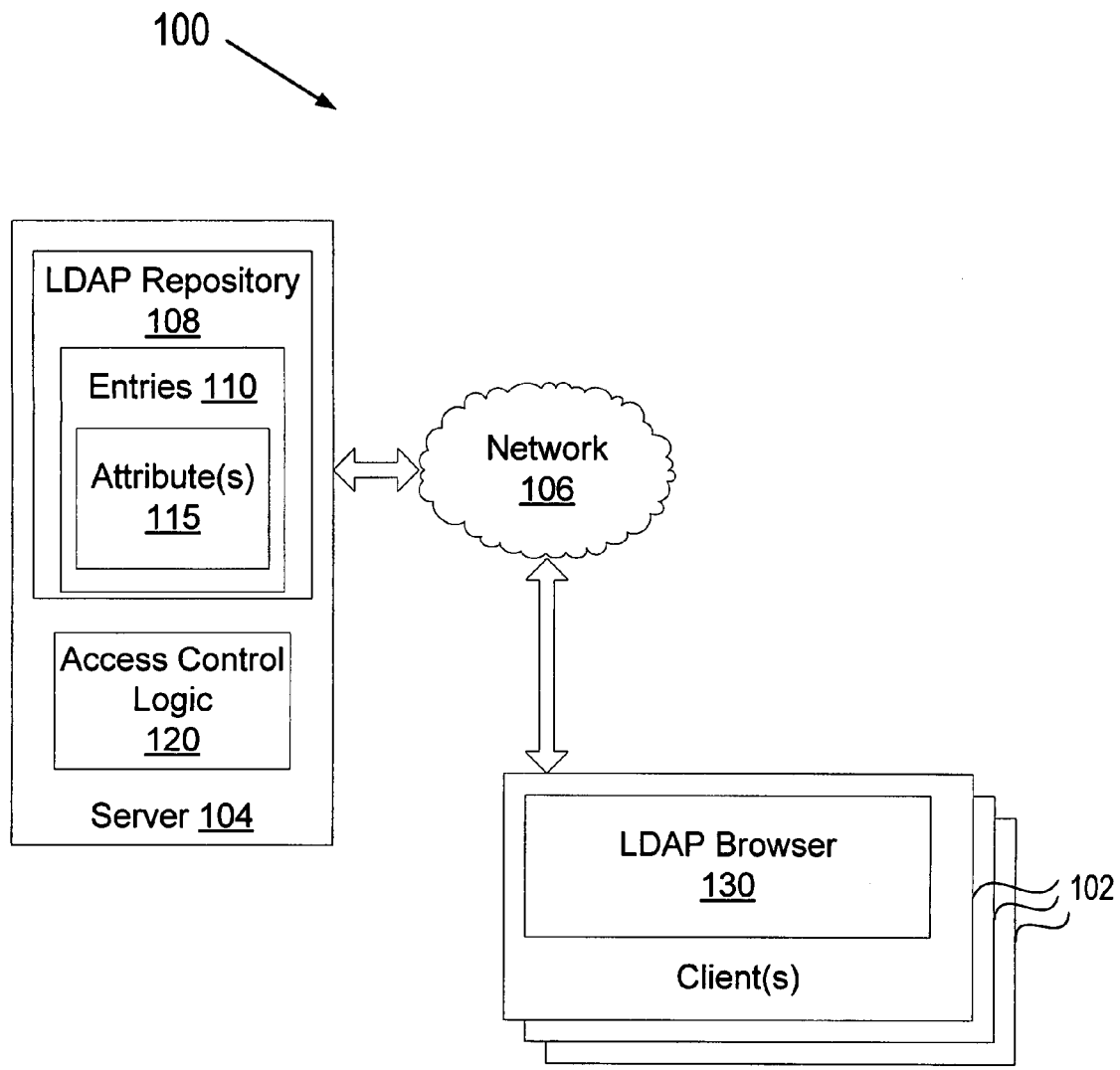
FIG. 1 illustrates a network architecture in which embodiments of the present invention may be implemented.

Described herein is a method and apparatus for applying access control instructions to attributes. In one embodiment, a request is received for permission to perform an operation on an attribute associated with an access control instruction that specifies an allowed type of channel for the operation. Further, if it is determined that a secure channel with a requestor has been established, the requested permission to perform the operation is granted.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "computing", "calculating", "determining", "displaying" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes a machine readable storage medium (e.g., read only memory ("ROM"), random access memory ("RAM"), magnetic disk storage media, optical storage media, flash memory devices, etc.), a machine readable transmission medium (electrical, optical, acoustical or other form of propagated signals (e.g., carrier waves, infrared signals, digital signals, etc.)), etc.

FIG. 1 illustrates an exemplary network architecture 100 in which embodiments of the present invention may operate. The network architecture 100 may include client devices (clients) 102, a server 104 and a network 106. The clients 102 may be, for example, personal computers (PCs), mobile phones, palm-sized computing devices, personal digital assistants (PDAs), etc. In one embodiment, the server 104 is a lightweight directory access protocol (LDAP) directory server. Alternatively, the server 104 may be a directory access protocol (DAP) directory server, a structured query language (SQL) server, etc.

The server 104 may contain a server front-end responsible for network communications, plugins for server functions (such as access control and replication), a basic directory tree containing server-related data, and a database back-end plugin responsible for managing the storage and retrieval of LDAP repository data. In one embodiment, the server 104 includes an LDAP repository 108. Alternatively, the LDAP repository 108 may reside on a different machine that may be coupled to the server 104 directly or via network.

The LDAP repository 108 may include a tree of data entries 110. Each of the entries 110 includes a unique identifier called a distinguished name (DN). The DN is made up of a parent entry's DN plus a relative distinguished name (RDN) constructed from attributes of the entry. Each of the entries may include one or more attributes 115, each attribute 115 having an attribute name (e.g., an attribute type or attribute description) and one or more values. The structure of the entries may be specified in the definition of the LDAP repository 108, and may include a logical or hierarchical arrangement. The definition of the LDAP repository 108 may be represented as a schema, a table, or some other data structure, and may reside independently or inside the LDAP repository 108.

The clients 102 and the server 104 are coupled to the network 106, which may be a public network (e.g., Internet) or a private network (e.g., Ethernet or a local area Network (LAN)). In one embodiment, the clients 102 communicate with the server 104 via a web server (not shown). For example, the clients 102 may host web browsers that communicate with the web server using HTTP to request information. The web server may then communicate with the server 104 using LDAP to retrieve requested information from the LDAP repository 108. Alternatively, the clients 102 may communicate directly with the server 104 using LDAP to request information stored in the LDAP repository 108. The clients 102 may communicate with the server 104 by sending operation requests. Examples of operation requests include requests to bind, to enable a secure connection, to search, to read an entry or attribute, and so on. When a requesting client fails to meet certain security requirements (e.g., access control rules), the server 104 may send a response to the client that denies the requested operation. When the requesting client meets security requirements, the requested operation may be performed, and results may be sent to the client in a response.

The server 104 may include an access control logic 120 that evaluates requests for access to protected resources and makes decisions about whether those requests should be granted or denied. The access control logic 120 may reside on the server 104, or external to the server 104. The access control logic 120 may base decisions on whether to grant access to particular entries 110 or attributes 115 based on access control instructions (ACI), which may include access control rules (e.g., a portion of an ACI that defines a permission and/or bind rule).

Access control instructions may be associated with, and thus control access to, an entire directory, a subtree of a directory, specific entries 110 in a directory, or a specific set of entry attributes 115. ACIs can be used to set permissions for a specific user, all users belonging to a specific group or role, or all users of a directory. ACIs can also limit access to specific locations (e.g., specific IP addresses) or specific domain name system (DNS) names.

Access control instructions may be stored in a directory as attributes 115 of entries 110. ACIs may also be stored within the LDAP repository 108 at the root of the database tree, included in an LDAP directory server startup file, and/or grouped into an access control list (ACL) that comprises a series of ACIs. An ACI attribute may be available for use on every attribute in a directory, whether or not it is defined for the object class of the entry. Alternatively, an ACI attribute may be associated with (used with) only one or a few attributes.

An ACI may include one or more of a target, a permission, and a bind rule. A target specifies what entries, attributes, etc., that an ACI applies to. Sets of attributes may be targeted by explicitly naming those attributes that are targeted, or by explicitly naming those attributes that are not targeted. An ACI targeted to a directory branch point may apply to the branch point as well as all child entries of the branch point. If no target is specified for an ACI, it may by default be targeted to the directory entry that contains the ACI.

A permission for an ACI specifies the type of operation allowed or disallowed by the ACI. A permission may apply to one or more of a read, write, search, compare, self-write, add, delete, proxy, or other operation. Particular operations may be restricted by specifying which permissions are allowed, or by specifying which permissions are not allowed. A bind rule may specify bind attributes, such as a specific distinguished name (DN), time of day, IP address, group, etc.

In one embodiment, an ACI specifies an allowed type of channel for an operation pertaining to an attribute. In particular, the ACI may specify that permission to perform a particular operation may only be granted if a secure channel is established with the requestor of this operation. For example, an ACI may only grant permission to read a particular attribute if a secure channel is established for returning the particular attribute to the requestor. Accordingly, if the secure channel is not established, the ACI may refuse to grant permission to perform particular operations on an attribute or attributes. In one embodiment, a secure connection includes a transport layer security (TLS) connection. Alternatively, a secure connection may be established using, for example, secure sockets layer (SSL) or Kerberos.

In one embodiment, an ACI specifies authorized users who are permitted to request one or more operations on an attribute. In one embodiment, an ACI specifies a necessary level of authentication (e.g., strong authentication or weak authentication) that is required before certain operations may be performed on an attribute. Weak authentication may be achieved when a client 102 provides a username and password. Strong authentication may be achieved when, for example, a one time password (OTP) or public key infrastructure (PKI) are used.

In one embodiment, an ACI may include multiple conditions that must be satisfied before permission to perform an operation is granted. For example, an ACI may require strong authentication and a secure channel. In one embodiment, multiple ACIs may be associated with a single entry or attribute. Thereby, there may be a requirement that each ACI's conditions be satisfied.

Figure 2:
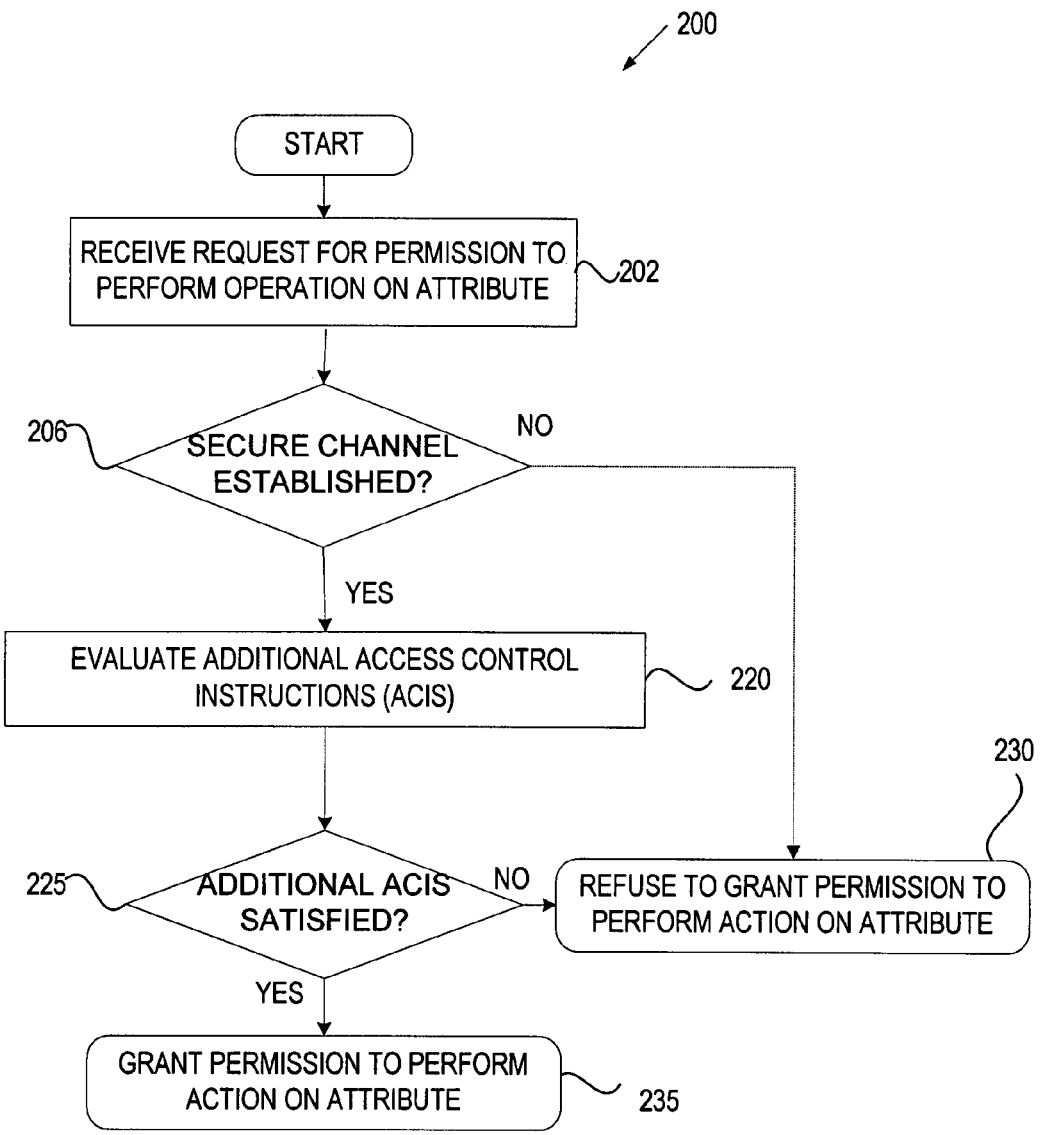
FIG. 2 illustrates a flow diagram of one embodiment of a method for controlling access to attributes.

FIG. 2 illustrates a flow diagram of one embodiment of a method 200 for controlling access to an attribute. The method may be performed by processing logic that may comprise hardware (e.g., circuitry, dedicated logic, programmable logic, microcode, etc.), software (such as instructions run on a processing device), or a combination thereof. In one embodiment, method 200 is performed by the server 104 of FIG. 1.

Referring to FIG. 2, method 200 begins with processing logic receiving a request pertaining to data in an LDAP repository (block 202). The request indicates an operation to be performed on an attribute, such as a read, write, obliterate, search, bind, compare or make operation.

At block 206, the process determines whether a secure channel has been established with a requestor of the operation. A secure channel may be established using, for example, transport layer security (TLS), secure sockets layer (SSL), or Kerberos communication protocols. If a secure channel has not been established, the process continues to block 230. If a secure channel has been established, the process continues to block 220.

At block 220, any additional access control instructions are evaluated. Additional ACIs may include, for example, instructions to perform operations on particular attributes only at certain hours, instructions to require strong authentication, instructions to require a specific IP address for a client, and so on.

At block 225, the process determines whether the additional access control instructions have been satisfied. If the additional access control instructions have been satisfied, the process continues to block 235, and permission to perform the requested operation on the attribute is granted. If the additional access control instructions have not been satisfied, the process continues to block 235. At block 235, the process refuses to grant permission to perform the requested action on the attribute.

Figure 3:
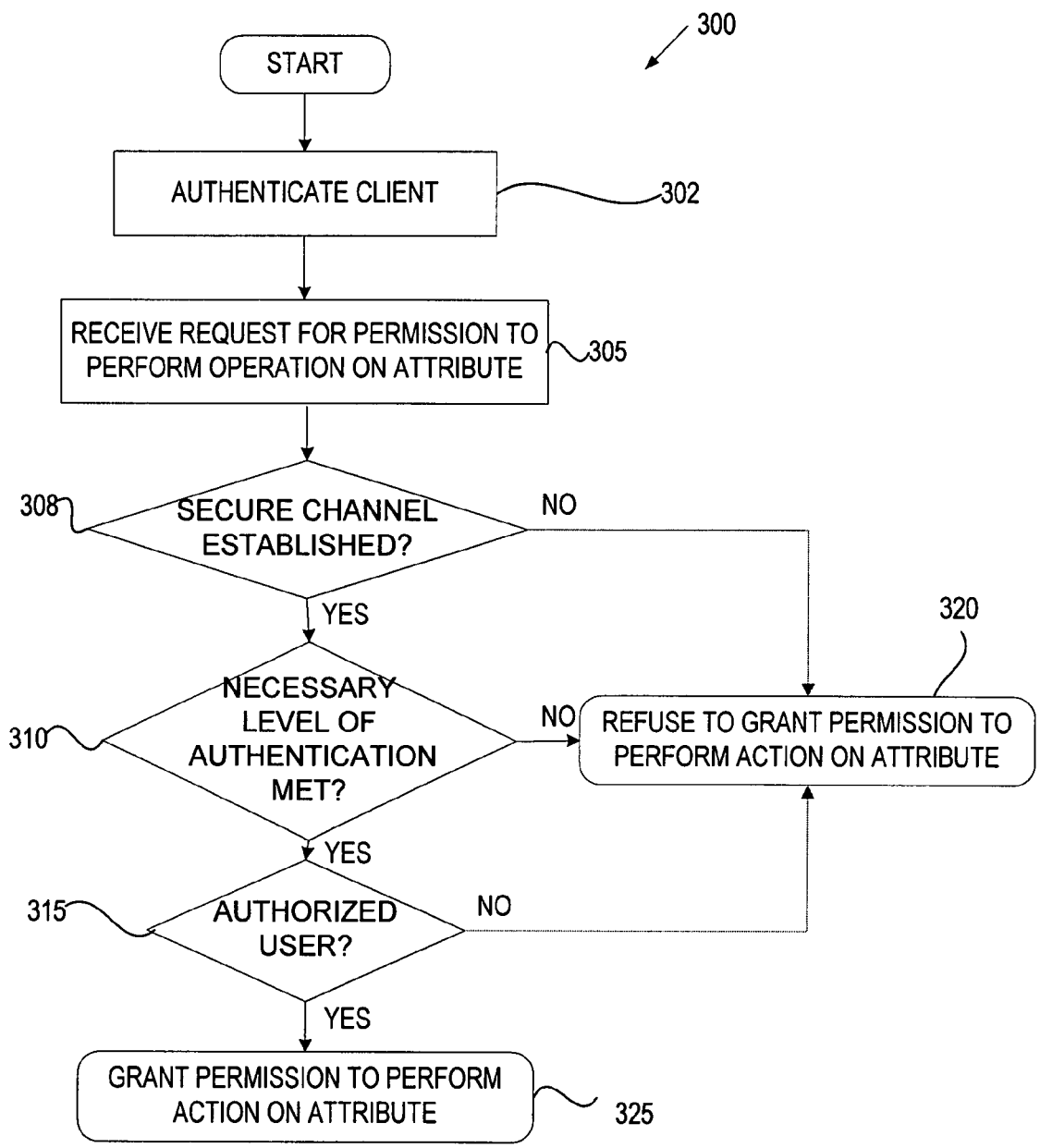
FIG. 3 illustrates a flow diagram of one embodiment of a method for controlling access to attributes.

FIG. 3 illustrates a flow diagram of one embodiment of a method 300 for controlling access to an attribute. The method may be performed by processing logic that may comprise hardware (e.g., circuitry, dedicated logic, programmable logic, microcode, etc.), software (such as instructions run on a processing device), or a combination thereof. In one embodiment, method 300 is performed by the server 104 of FIG. 1.

Referring to FIG. 3, method 300 begins with authenticating a client (block 302). The authentication may have varying levels (e.g., strong authentication, weak authentication, etc.). At block 305, the process receives a request for permission to perform an operation on an attribute. At block 308, the process determines whether a secure channel has been established with the client. If a secure channel has been established, the process continues to block 310. If a secure channel has not been established, the process continues to block 320.

At block 310, the process determines whether a necessary level of authentication has been met. A necessary level of authentication may be a weak authentication, a strong authentication, or a specific type of authentication, such as with an OTP. If the necessary level of authentication is not met, the process continues to block 320. If the necessary level of authentication is met, the process continues to block 315.

At block 315, the process determines whether the user of the client is an authorized user. An authorized user may be, for example, a user that has a specific distinguished name (DN), group membership, filter match, placement in the directory tree, etc. If the user is authorized, the process continues to block 325 and permission to perform the action on the attribute is granted. If the user is not authorized, the process continues to block 320. At block 320, permission to perform the requested action on the attribute is refused.

Figure 4:
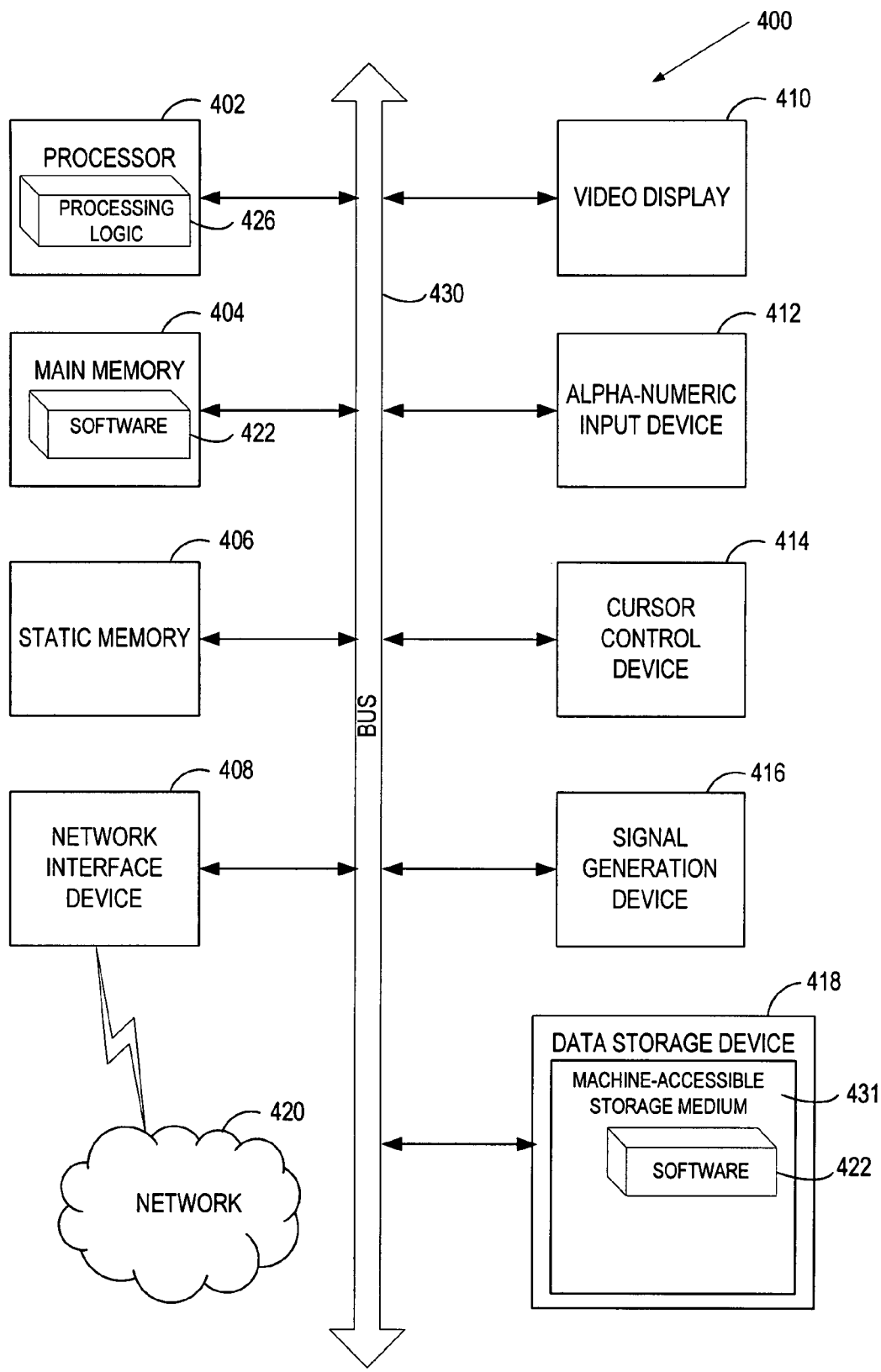
FIG. 4 illustrates a block diagram of an exemplary computer system.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-accessible storage medium 431 on which is stored one or more sets of instructions (e.g., software 422) embodying any one or more of the methodologies or functions described herein. The software 422 may also reside, completely or at least partially, within the main memory 404 and/or within the processing device 402 during execution thereof by the computer system 400, the main memory 404 and the processing device 402 also constituting machine-accessible storage media. The software 422 may further be transmitted or received over a network 420 via the network interface device 408.

The machine-accessible storage medium 431 may also be used to store LDAP repository data entries 424. LDAP repository data entries 424 may also be stored in other sections of computer system 400, such as static memory 406.

While the machine-accessible storage medium 430 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

Thus, a method and apparatus for controlling access to attributes, such as in an LDAP environment have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method, comprising:
receiving, by a lightweight directory access protocol (LDAP) directory server, a request for access to perform an operation on an attribute of an entry in an LDAP directory, wherein the attribute is associated with one or more access control instructions (ACIs) that are stored in the LDAP directory as additional attributes and that specify a plurality of access control criteria and an associated plurality of permissions, the plurality of permissions including a first permission for a first operation that can be performed when the plurality of access control criteria are satisfied and a second permission for a second operation that is not permitted unless additional access control criteria are satisfied, the plurality of access control criteria including a first criterion that specifies a particular type of secure channel for the first operation on the attribute and a second criterion that specifies a particular authentication level for the first operation on the attribute;
evaluating the request to determine whether the plurality of access control criteria are satisfied, including determining whether a channel between the directory server and a client that generated the request corresponds to the particular type of secure channel specified in the first criterion and determining whether a user authentication performed by the client corresponds to the particular authentication level specified in the second criterion;
determining whether the requested operation corresponds to the first operation; and
granting the access to perform the requested operation upon determining that the plurality of access control criteria are satisfied and that the requested operation corresponds to the first operation.

2. The method of claim 1, further comprising:
refusing to grant the access to perform the requested operation if the particular type of secure channel has not been established or the user authentication performed by the client does not correspond to the particular authentication level.

3. The method of claim 1, wherein the first operation comprises at least one of a read, write, obliterate, search, bind, compare or make action.

4. The method of claim 1, wherein the particular type of secure channel is one of a transport layer security (TLS), secure sockets layer (SSL), and Kerberos communication protocol.

5. The method of claim 1, wherein the plurality of access control criteria further include an authorized user criterion, and wherein evaluating the request to determine whether the plurality of access control criteria are satisfied includes determining whether the request is received from an authorized user.

6. A non-transitory machine-accessible medium including data that, when accessed by a machine, cause the machine to perform a method comprising:
receiving a request for access to perform an operation on an attribute of an entry in a lightweight directory access protocol (LDAP), wherein the attribute is associated with one or more access control instructions (ACIs) that are stored in the LDAP directory as additional attributes and that specify a plurality of access control criteria and an associated plurality of permissions, the plurality of permissions including a first permission for a first operation that can be performed when the plurality of access control criteria are satisfied and a second permission for a second operation that is not permitted unless additional access control criteria are satisfied, the plurality of access control criteria including a first criterion that specifies a particular type of secure channel for the first operation on the attribute and a second criterion that specifies a particular authentication level for the first operation on the attribute;
evaluating the request to determine whether the plurality of access control criteria are satisfied, including determining whether a channel between the machine and a client that generated the request corresponds to the particular type of secure channel specified in the first criterion and determining whether a user authentication performed by the client corresponds to the particular authentication level specified in the second criterion;
determining whether the requested operation corresponds to the first operation; and
granting the access to perform the requested operation upon determining that the plurality of access control criteria are satisfied and that the requested operation corresponds to the first operation.

7. The non-transitory machine-accessible medium of claim 6, wherein the method further comprises:
refusing to grant the access to perform the requested operation if the particular type of secure channel has not been established or the user authentication performed by the client does not correspond to the particular authentication level.

8. The non-transitory machine-accessible medium of claim 6, wherein the first operation comprises at least one of a read, write, obliterate, search, bind, compare or make action.

9. The non-transitory machine-accessible medium of claim 6, wherein the particular type of secure channel is one of a transport layer security (TLS), secure sockets layer (SSL), and Kerberos communication protocol.

10. The non-transitory machine-accessible medium of claim 6, wherein the plurality of access control criteria further include an authorized user criterion, and wherein evaluating the request to determine whether the plurality of access control criteria are satisfied, includes determining whether the request is received from an authorized user.

11. A system, comprising:
   a server that includes:
      a lightweight directory access protocol (LDAP) having a plurality of entries, each of the entries having at least one attribute associated with one or more access control instructions (ACIs) that are stored in the LDAP directory as additional attributes and that specify a plurality of access control criteria and an associated plurality of permissions, the plurality of permissions including a first permission for a first operation that can be performed when the plurality of access control criteria are satisfied and a second permission for second operation that is not permitted unless additional access control criteria are satisfied, the plurality of access control criteria including a first criterion that specifies a particular type of secure channel for the first operation and a second criterion that specifies a particular authentication level for the first operation; and
      an access control logic to receive a request for access to perform the operation on the at least one attribute of an entry, to evaluate the request to determine whether the plurality of access control criteria are satisfied, including determining whether a channel between the server and a client that generated the request corresponds to the particular type of secure channel specified in the first criterion and determining whether a user authentication performed by the client corresponds to the particular authentication level specified in the second criterion, to determine whether the requested operation corresponds to the first operation, and to grant the access to perform the requested operation upon determining that the plurality of access control criteria are satisfied and that the requested operation corresponds to the first operation.

12. The system of claim 11, further comprising:
   the client networked to the server, the client including a browser to request the access to perform the requested operation on the at least one attribute.

13. The system of claim 11, wherein the access control logic to refuse to grant the access to perform the requested operation if the particular type of secure channel is not established or the user authentication performed by the client does not correspond to the particular authentication level.

14. The system of claim 11, wherein the first operation comprises at least one of a read, write, obliterate, search, bind, compare or make action.

15. The system of claim 11, wherein the particular type of secure channel is one of a transport layer security (TLS), secure sockets layer (SSL), and Kerberos communication protocol.

16. The system of claim 11, wherein the plurality of access control criteria further include an authorized user criterion, and wherein to evaluate the request to determine whether the plurality of access control criteria are satisfied, the access control logic determines whether the request is received from an authorized user.

* * * * *